United States Patent [19]

Bone

[11] E Re. 29,310

[45] Reissued July 19, 1977

[54] APPARATUS FOR DISPENSING FASTENERS

[75] Inventor: Arnold R. Bone, Needham, Mass.

[73] Assignee: Dennison Manufacturing Company, Framingham, Mass.

[21] Appl. No.: 668,095

[22] Filed: Mar. 18, 1976

Related U.S. Patent Documents

Reissue of:

[64] Patent No.: 3,797,722
Issued: Mar. 19, 1974
Appl. No.: 276,118
Filed: July 28, 1972

U.S. Applications:

[63] Continuation-in-part of Ser. No. 169,413, Aug. 5, 1971, Pat. No. 3,759,435.

[51] Int. Cl.[2] ..... B25C 1/00
[52] U.S. Cl. ..... 227/67; 227/95
[58] Field of Search ..... 227/67, 95, 86, 137

[56] References Cited

U.S. PATENT DOCUMENTS

| | | | |
|---|---|---|---|
| 3,470,834 | 10/1969 | Bone | 227/67 |
| 3,650,451 | 3/1972 | Weiland et al. | 227/67 |
| 3,650,452 | 3/1972 | Finke | 227/67 |
| 3,659,769 | 5/1972 | Bone | 227/67 |
| 3,872,806 | 3/1975 | Bone | 227/67 |

*Primary Examiner*—Granville Y. Custer, Jr.
*Attorney, Agent, or Firm*—George E. Kersey

[57] ABSTRACT

Apparatus for dispensing fastener attachment members of the type having a filament with heads on both ends, the device including a casing, a needle projecting from the casing, the needle having a bore through which the fastener attachment member is adapted to be dispensed, a plunger or ejector adapted to force one head of the attachment member through the needle bore, the plunger advanced by the combination of a gear and sliding rack, the sliding rack in the form of a thin plate and in which the attachment members are fed before the needle and in front of the ejector by an indexing wheel advanced by a feed pawl with a slotted hole which allows it to rock in and out of engagement with the indexing wheel as it is moved back and forth.

12 Claims, 39 Drawing Figures

APPARATUS FOR DISPENSING FASTENERS

Matter enclosed in heavy brackets [ ] appears in the original patent but forms no part of this reissue specification; matter printed in italics indicates the additions made by reissue.

This application is a continuation-in-part of U.S. Pat. Application Ser. No. 169,413 filed Aug. 5, 1971, now U.S. Pat. No. 3,759,435 issued Sept. 18, 1973.

BACKGROUND OF THE INVENTION

This invention is directed to a new and improved apparatus for dispensing and inserting fastener attachment members having a filament and heads on either end.

This invention finds particular utility in applications such as anchoring tags to articles of apparel, coupling layers of material together, coupling buttons or the like to coats and other articles of clothing and in many other applications which require that two or more layers of material be held together.

The present invention is in particular an improvement over other devices such as shown in U.S. Pat. No. 3,103,666. In addition, U.S. Pat. Nos. 3,470,834 and 3,494,004 may also be referred to for a description of the state of the art.

For many years, a device such as shown in U.S. Pat. No. 3,103,666 has been sold and has been used quite widely. Although such devices are quite acceptable and reliable, there has developed a need for a new and improved device, or apparatus which would be even more reliable and durable.

SUMMARY OF THE INVENTION

In particular, this invention provides an apparatus which includes a new and improved feed mechanism which maintains a grip on the carrier supporting the fastener attachment member until the attachment member has been delivered into the needle bore of the needle of the apparatus. This features insures against misfeeds and jams and thus provides more reliable operation.

Still another improvement in this apparatus is that it is constructed so that a second feed of an attachment member is prevented from occurring until the previous operation has been fully completed. This too prevents jamming of the apparatus.

The apparatus of this invention also includes a new and improved rack or slide and drive arrangement for moving the ejector to force the attachment member through the needle bore. The rack is constructed so that there are no pockets to collect or retain lint or other foreign materials which could ultimately lead to the apparatus malfunctioning.

Other uses and advantages of the invention will in part be obvious and will in part also be apparent from the description which follows. The invention accordingly comprises the features of construction, combinations of elements, and arrangements of parts which will be exemplified in the construction hereinafter described.

DESCRIPTION OF THE PREFERRED EMBODIMENT

Figure 26:
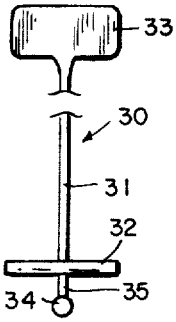
FIG. 26 is a front view of a fastener attachment member supported by a carrier therefore.
Figure 27:
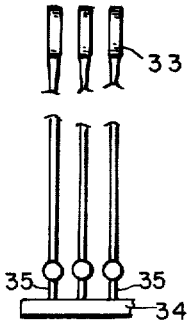
FIG. 27 illustrates in a side view a number of fastener attachment members supported by a carrier therefore.
Figure 32:
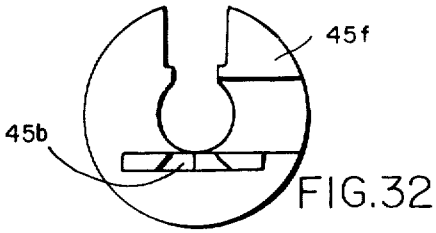

In FIGS. 26 and 27 there is illustrated fastener attachment members suitable for being dispensed by the apparatus of this invention. Attachment members are shown at 30 and include a filament 31 and heads 32 and 33. (See the aforementioned patents for further details). A carrier 34 with connecting members 35 is provided for coupling the attachment members 30 to the carrier. When the attachment members 30 are disposed through the needle, they are separated from the carrier by cutting the connecting member as will be disclosed hereafter.

Reference should now be had to FIGS. 1–33 for a brief description of the overall apparatus of the invention. The apparatus is shown at 38 and comprises an outer casing or body 40 comprising two halves 41a and 41b and a handle 42 pivotly coupled thereto by a coupling means 43. The body includes a nose portion 40a in which there is formed guides 40b, 40c and 40d for the passage of the fastener attachment members, carrier and coupling members into the apparatus and then for the exiting of carrier and coupling members out of the apparatus after the fastener attachment members have been dispensed.

In the nose 40a there is mounted a needle 45 having an elongated slot 45a for the passage of a fastener attachment head 32 therethrough while the filament 31 between heads 32 and 33 projects through the slot 45a. The needle includes a rear cutting edge 45b for cutting the coupling members 35 as well as a second slot 45c for permitting the head of the fastener attachment members to be fed into the apparatus.

The construction of the preferred needles for use in the apparatus are more fully shown in FIGS. 28–33 and will be described later herein.

The needle 45 is locked in place in the nose 41a by a locking pin 46 which includes a handle 46a and a slot therein (not shown) to permit the needle 45 mounting portion 45f to be inserted into a bore 47 provided in the nose 40a.

Figure 6:
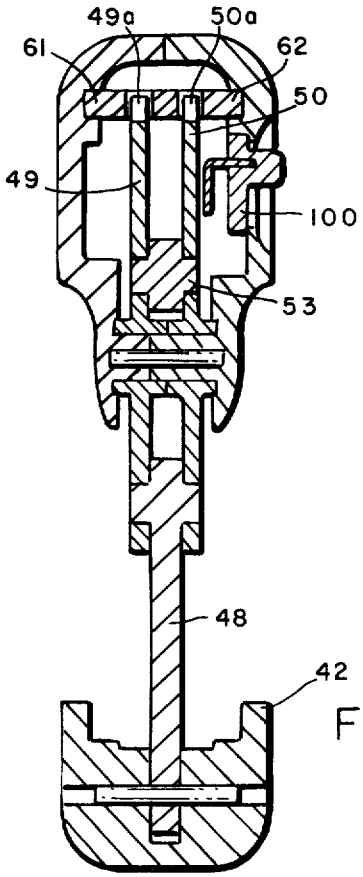
FIG. 6 is a sectional view taken along line 6—6 of FIG. 4.
Figure 7:
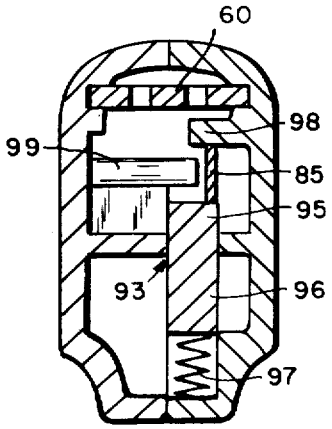
FIG. 7 is a sectional view taken along line 7—7 of FIG. 4.

In order to force or feed fastener attachment members into the needle slot 45a, the handle 42 is attached by a pivotally connected member 48 to gear means comprising a pair of gear segments 49 and 50, each having gear teeth 49a and 50a along the top surface thereof. The member 48 is pivotally connected at 51 to the gear segments as shown in FIG. 6. The gear segments 49 and 50 are in turn pivotally coupled to the body 40 of the apparatus as also shown more particularly in FIG. 6. At 60 there is provided a slide (see in particular FIGS. 4,6,7 and 8–10) which is positioned to slide back and forth in the body having guide slots 41d and 41e formed therein in the body halves 41a and 41b respectively.

The slide 60 has formed therein a plurality of holes 60a shaped to receive the gear teeth 49a and 50a. The holes extend from the bottom surface 60b to the top surface 60c and are formed in two rows as shown to receive the gear teeth of the gear segments. In this manner lint or other foreign matter is prevented from clogging the combined operation of the slide and gear segments since the lint will be pushed out of the holes 60a by the gear teeth. As the gear segments pivot back and forth the slide 60 moves forward and rearward.

Figures 4, 5:
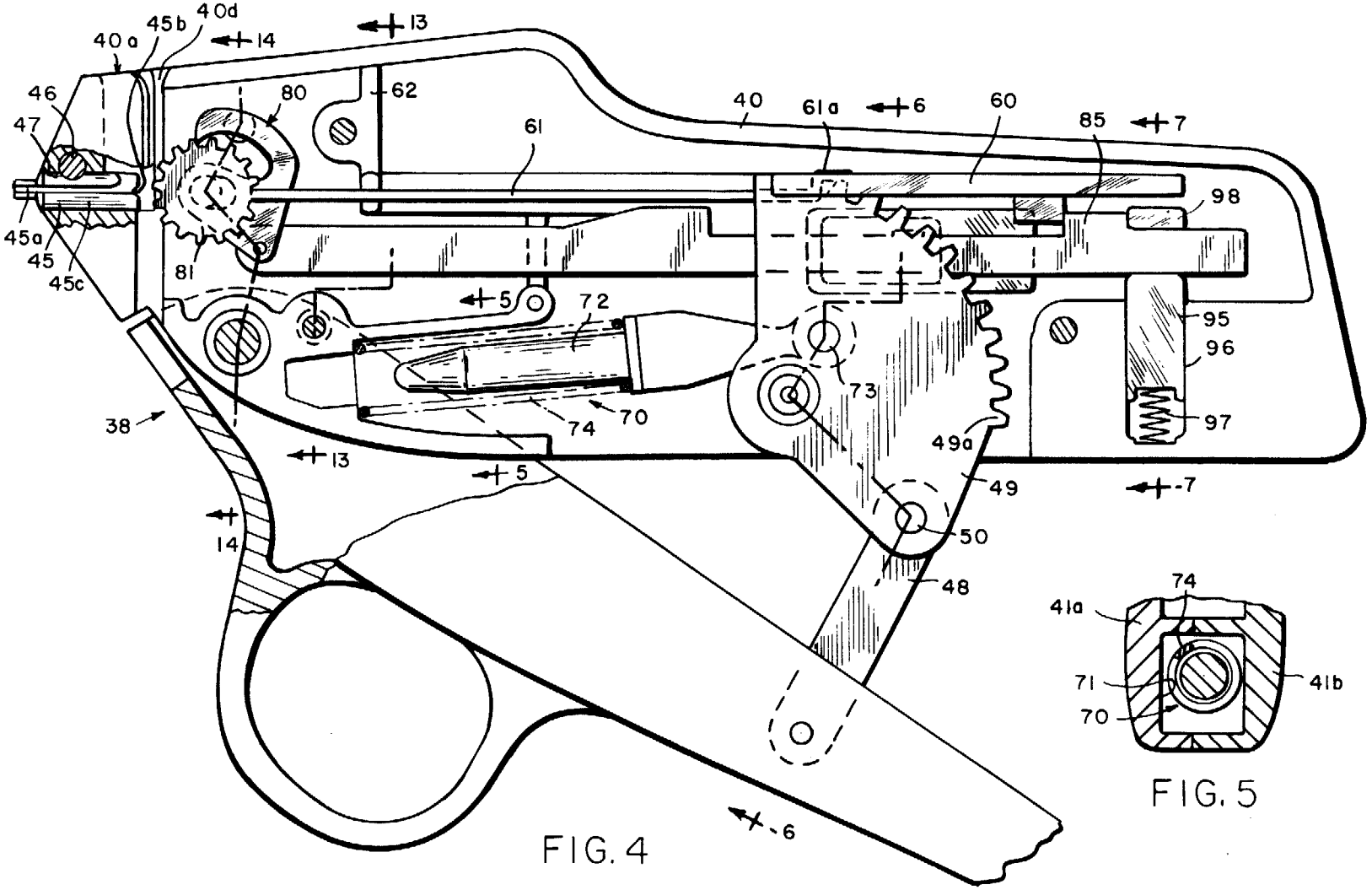
FIG. 4 is a side view of the apparatus with parts broken away and removed to show the operating mechanism of the apparatus.
FIG. 5 is a sectional view taken along line 5—5 of FIG. 4.

The slide 60 also includes a hole 60d and a cavity 60e which are constructed to receive an ejector or plunger 61 having an "L" shaped end 61a (see FIG. 4). The ejector end 61a is supported by the slide for movement therewith to permit the ejector to move back and forth to expel fastener attachment members thrugh the needle.

Figure 17:
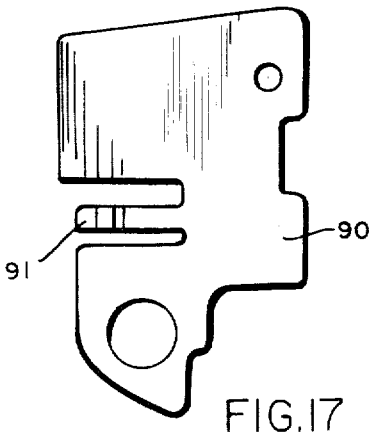
FIG. 17 is a view of the plate carrying a detent shown in FIG. 15.
Figure 19:
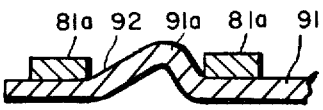
FIG. 19 is a sectional view taken along line 19—19 of FIG. 15.
Figure 18:
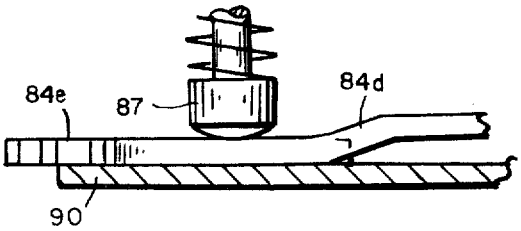
FIG. 18 is a sectional view taken along line 18—18 of FIG. 15.
Figure 14:
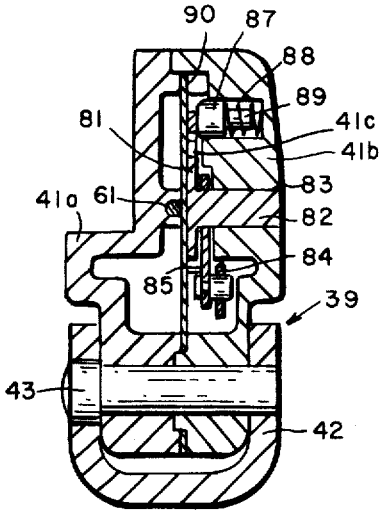
FIG. 14 is a sectional view taken along line 14—14 of FIG. 4.
Figure 13:
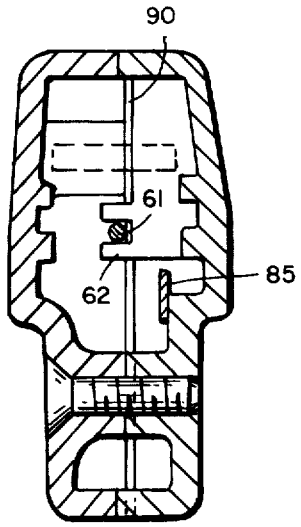
FIG. 13 is a sectional view taken along line 13—13 of FIG. 4.

The ejector 61 is supported at its forward end by a guide member 62 (see FIG. 4 and FIG. 13) and a separator or cover plate 90 held between the body halves (see FIGS. 13, 14 and 17).

The rotation of the handle 42 causes the gear segments (see FIG. 4) to rotate counterclockwise to move the ejector in a timed manner forward to force a head 32 of the fastener attachment member 30 through the needle to dispense it therefrom. As the ejector moves forward it causes the coupling member 35 to be severed by the cutting edge 45b of the needle. In order to return the ejector rearward again for the next sequence of operations to expel the next one of a plurality of fastener attachment members, there is provided a resilient return means 70 comprising a cavity 71 formed in the body for the movement of a telescoping member 72 therein. The telescoping member 72 is pivotally coupled to the gear segments 49 and 50 at 73 (see FIGS. 4 and 6) to rotate the cam segments clockwise by the action of resilient biasing means such as a spring 74 positioned in the cavity 71. Thus after the handle 42 is rotated or closed towards the body and then released, the return means will cause the handle to move away from the body to the extended position shown in FIG. 4.

The apparatus also includes an indexing mechanism 80 for positioning fastener attachment members one at a time at the rear of the needle in order to be dispensed by the ejector therethrough. The indexing mechanism 80 comprises an indexing wheel or indexing gear 81 supported for rotation by a shaft 82 coupled thereto which in turn is supported by a bore 83 in the body (see FIGS. 4, 14 and 15).

The indexing gear is positioned in a space between the cover 90 and a shelf 41c (see FIGS. 14 and 15) provided in body half 41b. Clearance exists between the gear 81 and the cover 90 and shelf 41c so that the wheel can rotate freely.

Figure 15:
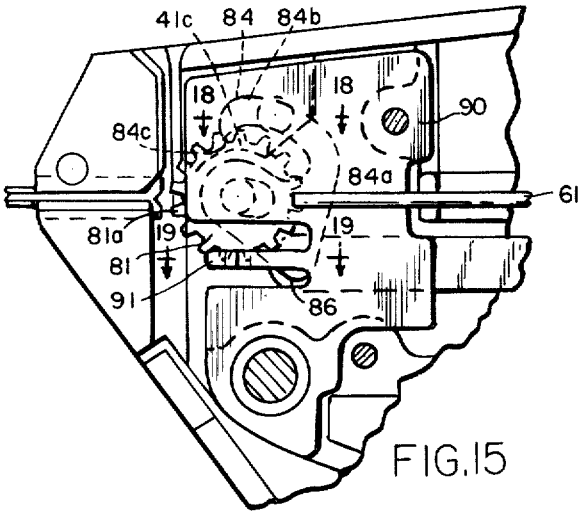
FIG. 15 is an enlarged side view of the indexing or feed mechanism according to the invention.

The gear 81 has a plurality of teeth 81a mounted along the circumference thereof which are adapted to engage the coupling members 35 to move the carrier 34 and the fastener attachment members through the apparatus. The indexing gear is rotated counterclockwise as shown in FIGS. 4 and 15 by the provision of a pawl 84 which is constructed with a slotted pivot hole 84a supported by support means such as the shaft 82 coupled to the indexing gear 81. The pawl 84 is adapted to rock back and forth over the shaft 82 as the result of the movement of drive means such as a link 85 which is pivotally coupled thereto at 86. The pawl preferably includes a pusher such as a hook-like end 84b preferably having a pointed tip 84c to engage one tooth at a time of the indexing gear to rotate it (see FIGS. 4 and 16).

The pawl end 84b is preferably provided with a bend at 84d so that a portion of the pawl will lie against the cover 90 (see FIG. 18) thus providing a space, or clearance between the pawl and the wheel to provide free movement of the slotted portion of the pawl so the pawl is rocked back and forth. The tip 84c of the pawl also extends above the wheel teeth 81a as shown in FIG. 15. The pawl thus preferably has a portion that is in a parallel plane with the wheel and has another portion which lies within the plane of the wheel. The pawl is held in place by a resiliently biased member 87 which is positioned within a cavity 88 and urged toward the pawl by a resilient biasing means such as a spring 89 (see FIG. 14).

The member 87 urges the pawl 84 against the cover 90 to frictionally hold the hook-end portion 84b against the cover (see FIG. 18) as the pawl is rocked back and forth on the shaft.

The slot 84a has parallel upper and lower walls 84aa which are angularly disposed with respect to point 84c so that when the pawl is rocked in one direction to the left in FIG. 4, point 84c is cammed out of engagement with the indexing wheel and when rocked in an opposite direction point 84c is cammed into engagement with the indexing wheel. Thus there exists an acute angle "$\alpha$" between the parallel walls 84aa and point 84c as shown to effect the above mentioned camming movement. Pawl 84 (portion 84b) is frictionally held against cover 90 by plunger 87 and spring 88 (see FIG. 18) so that when the opposite end of pawl 84 is moved by link 85 the first action that takes place is to move slotted portion 84a to the end of its travel. Because the sides of the slot are angled with respect to the tip of the pawl 84c (see FIG. 16) movement in one direction causes tip 84c to cam out of engagement with gear 81 (see FIG. 20) and movement in the other direction causes tip 84c to cam into engagement with the gear 81. Further movement of link 85 in the direction which caused engagement will then cause rotation of the gear (see FIG. 21).

In order to prevent the wheel from rotating as the pawl is rocked back and forth for indexing of the wheel, there is provided on cover member 90 (see FIGS. 15, 17 and 19) a resilient member 91 extending therefrom which has a projection or detent 91a.

The detent 91a is adapted to be positioned in the space 92 between the teeth 81a (see FIG. 19) to prevent the wheel from rotating. The detent 91a is adapted to slide over the side of the teeth 81a when sufficient force is applied to rotate the wheel, as for example by the action of the pawl 84. Thus the detent 91a acts as a stop which can be overriden by the forceable movement of the wheel 81. The provision of the detent also provides positive control of the carrier for the fastener attachment members.

The drive means to rock the pawl back and forth comprises the link 85 which is mounted in the body 40 and is supported for slidable movement (see FIGS. 7, 11, 12 and 20–22).

The link 85 includes a cutout 85a having stop means 85b at either end of the cutout 85a. The stop means are adapted to engage a projection 60f extending downwardly from the slide 60 (see FIGS. 8, 9 and 20–22). Thus as the slide 60 moves back and forth, the link 85 will be moved therewith to cause the link to slide back and forth to rock the pawl back and forth to index the indexing gear. The link 85 is supported at its rearward end by a member 95 positioned in a cavity 96 (see FIGS. 4 and 7) formed in the body and which is resiliently biased against the link 85 by a spring 97. The upward movement of the link 85 is restricted by a projection 98 extending from the body (see FIGS. 4 and 7), and the sideway movement of the link 85 in one direction is restricted by a pin 99 coupled to the body (see FIG. 7). The projection 98 may also act as a rear stop for stop 85b if desired (see FIG. 37 for the preferred construction and relationship between members 85b and 98).

Figure 1:
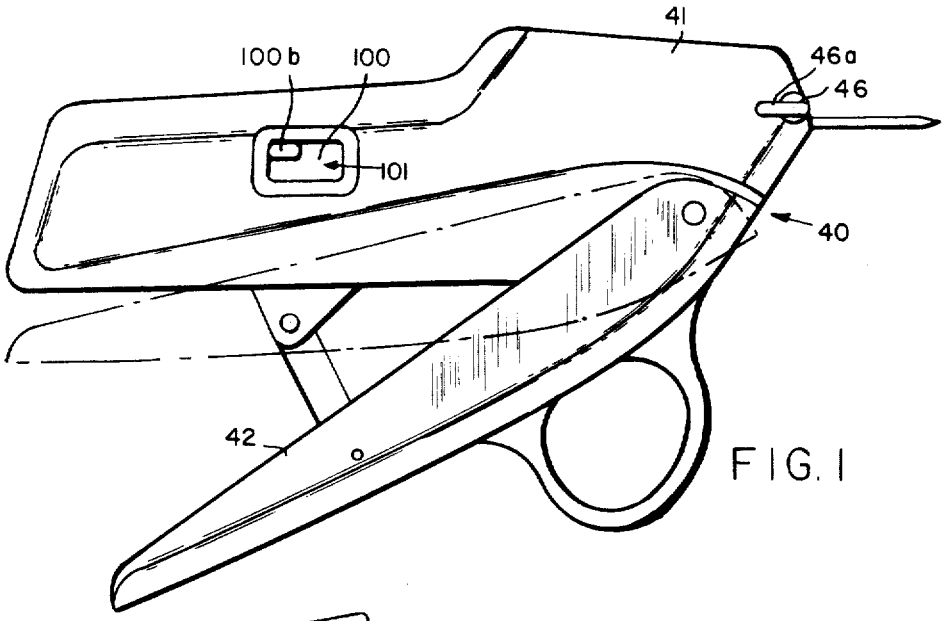
FIG. 1 is a side view of the apparatus according to the invention showing one of the handles of the apparatus in two positions.
Figure 3:
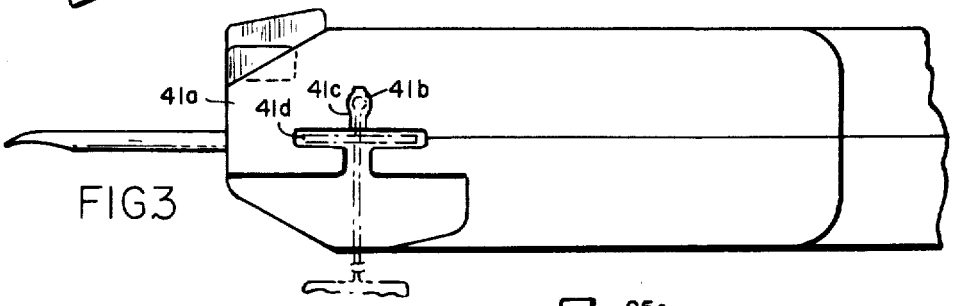
FIG. 3 is a top view of a portion of the apparatus.
Figure 12:
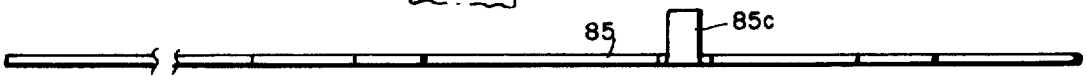
FIG. 12 is a top view of the bar shown in FIG. 11.
Figure 11:
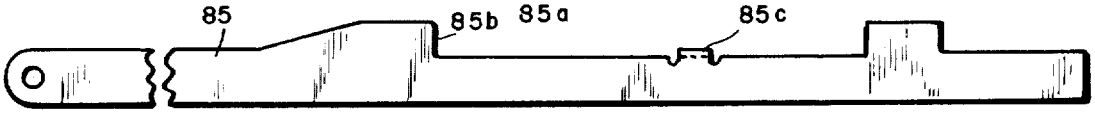
FIG. 11 is a side view of a slidable bar or link according to the invention which is adapted to be moved back and forth by the plate as shown in FIGS. 8 and 9.
Figure 8:
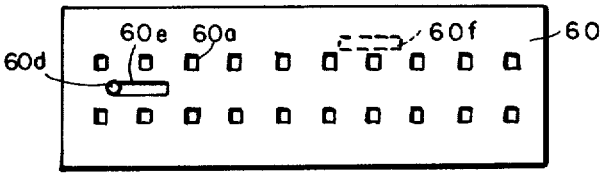
FIG. 8 is a top view of a slidable slide or rack adapted to be moved back and forth by the movement of the handle according to the invention.
Figure 9:
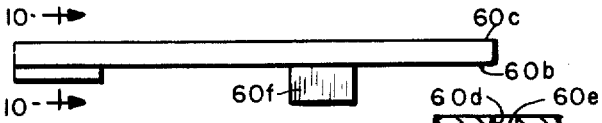
FIG. 9 is a side view of the slide of FIG. 8.
Figure 10:
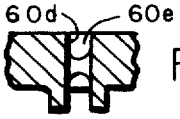
FIG. 10 is a sectional view taken along line 10—10 of FIG. 9.
Figure 16:
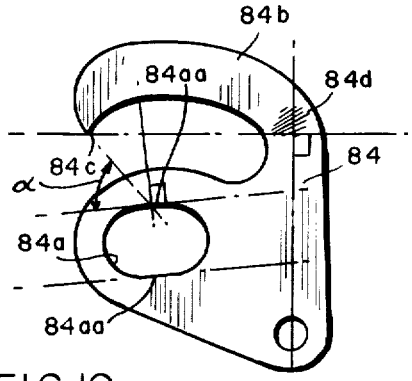
FIG. 16 is a side view of the feed pawl shown in FIG. 15.
Figure 2:
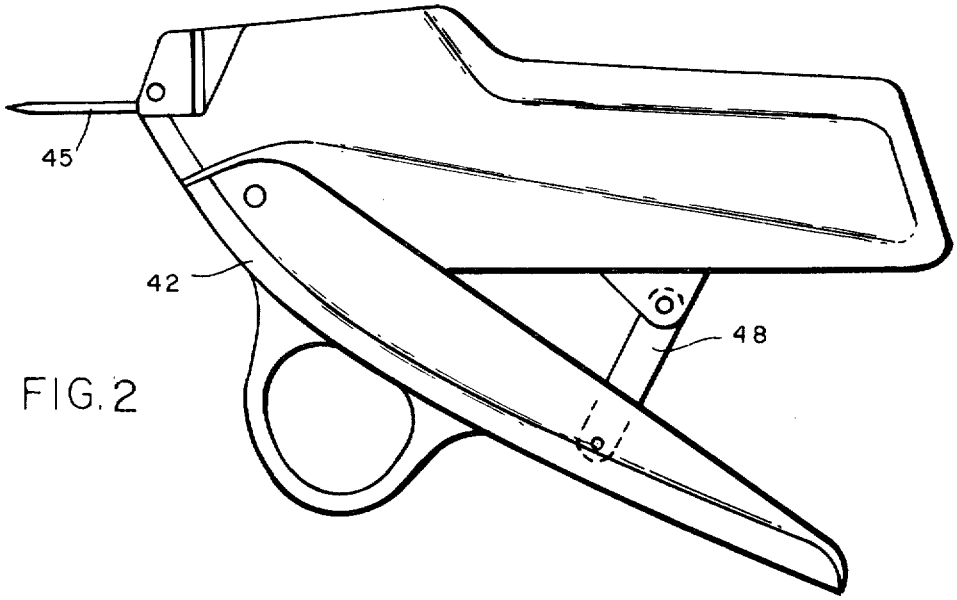
FIG. 2 is a view of the opposite side of the apparatus according to the invention.

The link 85 also includes a projection 85c extending sideways as shown in FIGS. 11 and 12. The projection is coupled to release control member 100 (see FIGS. 23–25, and FIG. 1) having a bore 100a into which the projection 85c extends and is held thereby. The member 100 includes a finger projection 100b which extends through a window 101 formed in the body (see FIG. 1).

Figure 22:
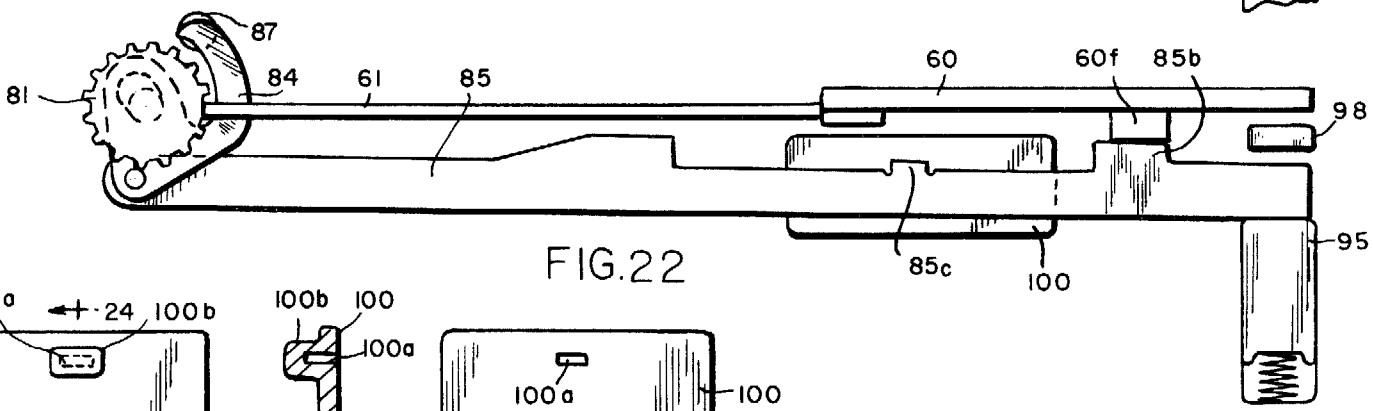
Figure 25:
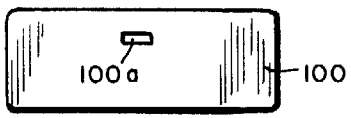
FIG. 25 is a back view of the member shown in FIG. 23.
Figure 24:
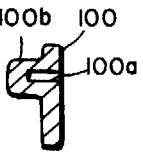
FIG. 24 is a sectional view taken along line 24—24 of FIG. 23.
Figure 23:
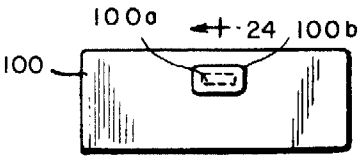
FIG. 23 illustrates in a front view the member for permitting the indexing wheel shown in FIG. 4 to free wheel.
Figure 28:
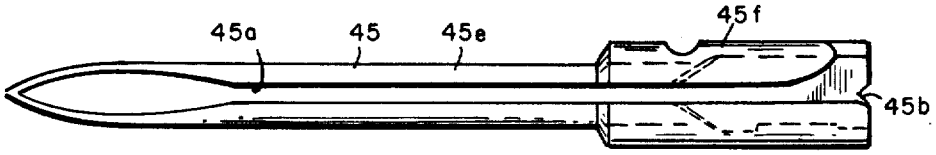
FIGS. 28–32 illustrates in side view, top view and bottom with parts broken away, and end view respectively of a needle suitable for use in this invention.
Figure 29:
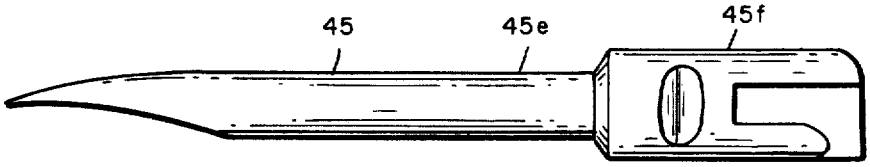
Figure 30:
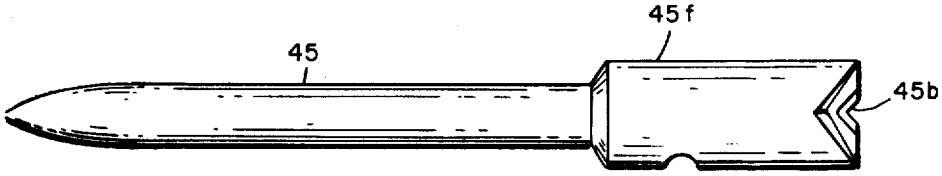
Figure 31:
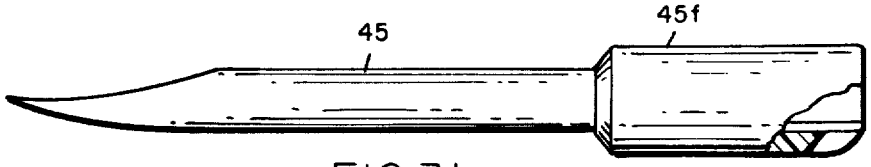

The downward and sideways movement (to the left of FIG. 22) of the projection 100b will cause as shown in FIG. 22 the link 85, to pull the pawl 84 away from the teeth of the indexing gear 81 and thus permit a carrier 34 with fastener attachment members coupled thereto to be pulled out therefrom by rotating the gear 81 while over-riding the action of the detent 91a.

Figure 20:
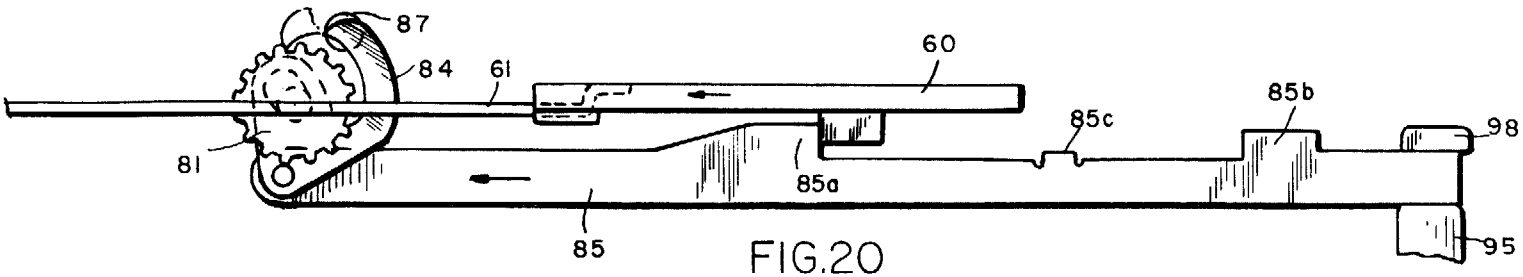
FIGS. 20–22 illustrates the operation of the feed mechanism of the invention.
Figure 21:
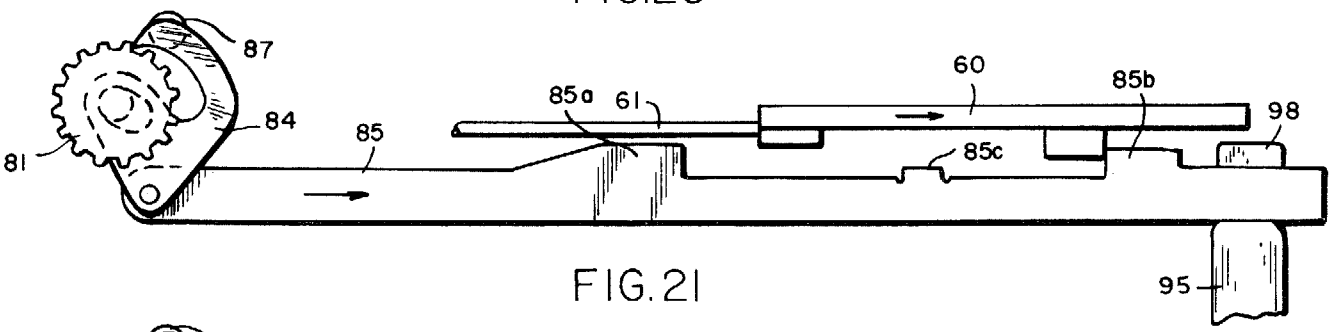

Briefly, the operation of the apparatus of the invention is as follows: (1) fastener attachment members and a carrier therefore are fed into the apparatus by inserting the carrier with the fastener attachment members coupled thereto through guides in the nose; (2) the handle 43 is then closed upon the body to move the slide 60 to the left as shown in FIG. 20 to cause the ejector 61 to force a fastener attachment head through the needle while at the same time causing the coupling member to be served by the needle cutting edges 45b; (3) the movement of the link to the left also rocks the pawl 84 to the right as shown in FIG. 20; (4) when the handle 42 is released, the resiliently biased member 72 moves towards the right to cause the slide 60 to move rearward thus moving the link 85 to the right; (5) this also causes the ejector to be retracted from the needle and further causes the pawl 84 to be rocked forward to rotate the indexing gear counterclockwise to position the next fastener attachment member into position to be dispensed from the needle.

In FIGS. 28–31 there is shown the preferred construction of the needle 45 shown in FIG. 4. The needle comprises two parts which are mechanically locked together, one part being shown at 45e and the mounting portion being shown at 45f. The mounting portion preferably is constructed of a hard or rigid plastic while the part 45e is preferably constructed of metal. The needle includes the slot 45a, the rear cutting edge 45b, the second slot 45c as heretofore described. The rear cutting edge is preferably shaped as a "V" with the bottom of the "V" having a small radius of curvature to facilitate cutting of materials such as polyurethane.

Figure 33:
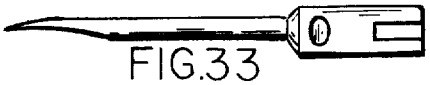
FIG. 33 illustrates another needle construction suitable for use in this invention.

In FIG. 33 there is shown a slightly different needle construction. This needle is preferably one piece metal and has the slots and cutting edge as heretofore described. For further reference to the construction of preferred needles useful in the practice of this invention reference may be had to U.S. Patent Application of the same inventor of this application entitled "Fastener Attachment System Needle Constructions" filed in the U.S. Patent Office on June 30, 1971 now copending as U.S. Ser. No. 158,438.

Figure 34:
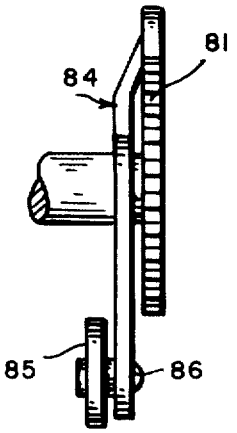
FIG. 34 illustrates in a front view taken from the left of FIG. 21 looking towards the right of FIG. 21 the feed mechanisms of the invention.
Figure 35:
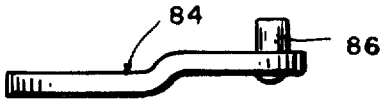
FIGS. 35 and 36 illustrate in top and side views the preferred construction of the member 84 shown in FIG. 34.
Figure 36:
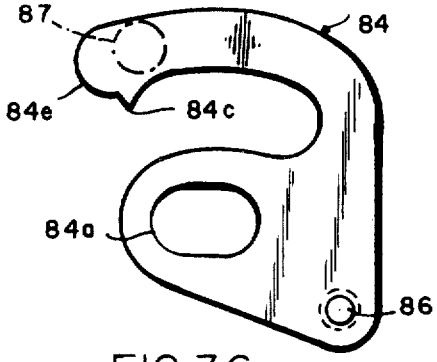

Reference should briefly be had to FIGS. 34–36 which illustrates the most preferred construction of the pawl 84. The pawl 84 in the construction shown includes a retainer or projection 84c which extends beyond the tip or point of 84c. The retainer or projection 84e is preferably provided to insure that the pawl 84 doesn't slip out of contact with member 87 when it is drawn back when member 85c is depressed.

Figure 37:
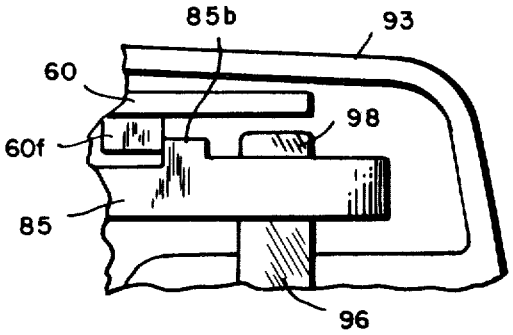
FIG. 37 illustrates the preferred construction of the member 85 and its at rest position with respect to member 98.

Reference should now be had to FIG. 37 which illustrates the most preferred construction of the member 85, and particularly member 85b and its at rest condition as illustrated in FIG. 4. In this Figure the member 85b is shortened so that it doesn't engage member 98 in any condition and thus member 98 would not act as a stop therefore.

Figure 38:
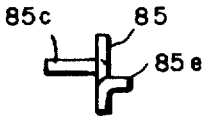
FIGS. 38 and 39 illustrate in front and side views the preferred construction of the member 85.
Figure 39:
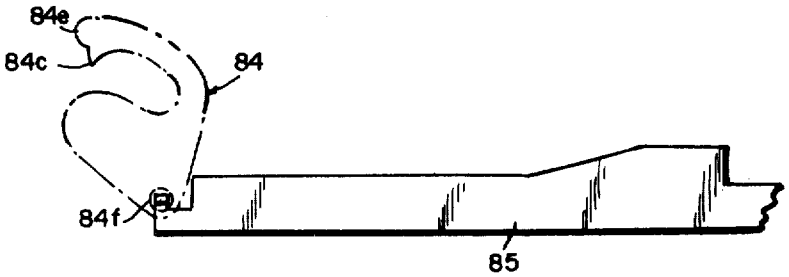

In FIGS. 38 and 39 there is illustrated the now preferred construction of the drive means 85 which is now constructed with a finger or member 85e formed or bent therefrom and which is positioned within a second hole 84f provided in the pawl 84. In this manner the pawl is rocked back and forth with member 85 motion.

I claim:

1. In an apparatus for dispensing fastener attachment members one at a time, said fastener attachment members being coupled to a carrier by a coupling member and which includes a body, a hollow needle having an elongated slot along one side supported by said body and extending therefrom, an ejector supported by the body for driving a head of the fastener attachment member through said needle with a filament of the fastener attachment member coupled to the head projecting through said slot, and an indexing wheel having a plurality of teeth for engaging the coupling members to feed one fastener member at a time into position to be fed through said needle, the improvement comprising an indexing pawl for engaging the teeth of the wheel, one at a time, to advance the wheel to position fastener attachment members into position to be fed through said needle, said pawl having a slotted pivot hole and a tip for engaging the teeth of the wheel, first means supported by the body and passing through the slotted pivot hole to permit the pawl to rock back and forth thereon, and drive means coupled to the pawl for rocking the pawl back and forth to cause said tip to engage said teeth one at a time to advance the indexing wheel, in which said first means comprises a shaft coupled to said indexing wheel which supports it for rotation, in which said pawl is provided with a bend so that a portion of the pawl lies next to the indexing wheel and another portion of the pawl extends above said indexing wheel in order to engage the teeth of said wheel, in which first resilient biasing means to provided to bias said pawl against a cover, said resilient biasing means supported by said body, and in which the pawl includes a projecting retainer portion for engaging the resilient biasing means when the pawl is in one of its possible positions.

2. In an apparatus for dispensing fastener attachment members one at a time, said fastener attachment members being coupled to a carrier by a coupling member and which includes a body, a hollow needle having an elongated slot along one side supported by said body and extending therefrom, an ejector supported by the body for driving a head of the fastener attachment member through said needle with a filament of the fastener attachment member coupled to the head projecting through said slot, and an indexing wheel having a plurality of teeth for engaging the coupling members to feed one fastener member at a time into position to be fed through said needle, the improvement comprising an indexing pawl for engaging the teeth of the wheel, one at a time, to advance the wheel to position fastener attachment members into position to be fed through said needle, said pawl having a slotted pivot hole and a tip for engaging the teeth of the wheel, first means supported by the body and passing through the slotted pivot hole to permit the pawl to rock back and forth thereon, and drive means coupled to the pawl for rocking the pawl back and forth to cause said tip to engage said teeth one at a time to advance the indexing wheel, in which the indexing pawl has a second hole formed therein and in which the drive means is provided with a projecting finger which is positioned within the hole to rock the pawl back and forth.

*3. Apparatus for attaching tags using fasteners, each fastener including a bar section and a button section joined by a filament section; said apparatus comprising a body; a tubular guide member extending outwardly of the said body, a bore extending lengthwise of said tubular member and an elongated slot in the side of said tubular member communicating with said bore; an ejector engageable with the bar section of the fastener for driving the bar section through the bore while its filament section extends through the slot; means for operating said ejector; means, including a toothed member, for advancing one fastener at a time until its bar section is in alignment with said bore; a pawl connected to a link having spaced stop means and cooperable with said toothed member; a slide coupled to the operating means and mounted for reciprocal motion within said body; said slide having a portion thereof engageable with said spaced stop means.*

*4. Apparatus for attaching labels and the like to textiles and similar objects with attachments, each comprising a filament with a cross bar at one end and connected to form an assemblage, the apparatus having (a) a housing for guiding the assemblages and a hollow tube-like projection through which individual members of the assemblage are ejected with their cross bars within the tube and their filaments extending from the tube, (b) an ejector and an actuator coupled thereto, (c) a ratchet wheel rotatably mounted within the housing, (d) means for operating said ratchet wheel in a direction to feed a cross bar into alignment with said hollow tube-like projection, (e) a spring mounted within the housing to inhibit motion of the ratchet wheel in a direction opposite to the direction of feed, (f) a slide operated by said actuator and engageable with the ratchet operating means for moving the latter between two end positions.*

*5. Apparatus in accordance with claim 4 for dispensing attachments wherein said tube-like projection has an enlarged end for removable insertion into said housing and is provided with a cutting edge over at least a portion of said enlarged end.*

*6. Apparatus for dispensing attachments comprising a device for receiving and feeding an assemblage of attachments and a needle having an enlarged portion for removable insertion into said device, said needle having a slot to permit individual attachments to be dispensed therethrough, and a cutting edge on said enlarged portion for severing an individual attachment from said assemblage for feeding through said needle.*

*7. Apparatus for dispensing attachment members, each being formed by a filament with a head at one end and a cross bar at the other end and being moved into position for being dispensed, comprising an ejector, an indexing wheel, a pawl for operation said indexing wheel, an extension for said pawl, a slide mounted for reciprocating motion in said apparatus for engaging said extension to move said pawl discontinuously to two distinctive positions, and means for moving said slide and said ejector.*

*8. Apparatus in accordance with claim 7 wherein the extension of said pawl has two spaced-apart stops and said slide has a projection which contacts said stops alternatively during operation of the moving means.*

*9. Apparatus as defined in claim 7 wherein said ejector is connected to said slide, said moving means comprising a gear pivotally mounted in said apparatus to operate said slide, and means pivotally mounted to operate said gear, whereby said gear acts upon said slide to advance said*

*ejector into position for dispensing said attachment members.*

*10. Apparatus as defined in claim 7 wherein said attachment members are dispensed through a hollow needle which includes a mounting portion removably recessed in said apparatus.*

*11. Apparatus as defined in claim 10 wherein the mounting portion is constructed of rigid plastic and the remainder of the needle is constructed of metal.*

*12. Apparatus as defined in claim 10 wherein said needle includes a cutter in the mounting portion thereof.*

* * * * *